US010087603B2

(12) United States Patent
Mitchell et al.

(10) Patent No.: US 10,087,603 B2
(45) Date of Patent: Oct. 2, 2018

(54) STABILITY CONTROL SYSTEM FOR MACHINE IN MOTION

(71) Applicant: Caterpillar Inc., Peoria, IL (US)

(72) Inventors: Michael D. Mitchell, Aurora, IL (US); Mark A. Robinson, Davis Junction, IL (US); Adam M. Plecker, Joliet, IL (US)

(73) Assignee: Caterpillar Inc., Deerfield, IL (US)

( * ) Notice: Subject to any disclaimer, the term of this patent is extended or adjusted under 35 U.S.C. 154(b) by 86 days.

(21) Appl. No.: 15/278,054

(22) Filed: Sep. 28, 2016

(65) Prior Publication Data
US 2018/0087242 A1 Mar. 29, 2018

(51) Int. Cl.
*E02F 9/20* (2006.01)
*B62D 15/02* (2006.01)
*B62D 5/10* (2006.01)
*B62D 6/04* (2006.01)
*B62D 12/00* (2006.01)
*B62D 6/02* (2006.01)

(52) U.S. Cl.
CPC ............. *E02F 9/2087* (2013.01); *B62D 5/10* (2013.01); *B62D 6/02* (2013.01); *B62D 6/04* (2013.01); *B62D 12/00* (2013.01); *B62D 15/02* (2013.01); *E02F 9/2029* (2013.01)

(58) Field of Classification Search
None
See application file for complete search history.

(56) References Cited

U.S. PATENT DOCUMENTS

| 4,371,864 | A | * | 2/1983 | Kawasaki | ................ | B60Q 1/54 |
| | | | | | | 180/171 |
| 4,480,714 | A | | 11/1984 | Yabuta et al. | | |
| 5,117,935 | A | | 6/1992 | Hall | | |
| 7,721,842 | B2 | | 5/2010 | Forero | | |
| 8,260,499 | B2 | | 9/2012 | Boydell | | |
| 9,539,901 | B1 | * | 1/2017 | Clauss | .................... | B60K 31/18 |
| 2007/0216521 | A1 | * | 9/2007 | Guensler | .............. | G08G 1/0104 |
| | | | | | | 340/439 |
| 2014/0039772 | A1 | * | 2/2014 | Jensen | ................ | B60K 23/0808 |
| | | | | | | 701/69 |
| 2015/0259880 | A1 | * | 9/2015 | Sharma | ................ | E02F 9/2025 |
| | | | | | | 701/43 |

(Continued)

*Primary Examiner* — Frederick M Brushaber
(74) *Attorney, Agent, or Firm* — James S. Bennin

(57) ABSTRACT

A system may comprise a plurality of sensors configured to transmit sensor information regarding a speed of a machine, a position of an implement of the machine, a payload of the machine, a grade of a surface on which the machine is traveling. The system may further comprise an electronic control module configured to receive steering command information regarding a steering command of the machine; determine, based on the steering command information, one or more articulation parameters associated with the steering command, determine the speed, the position of the implement, the payload, and the grade based on the sensor information. The electronic control module may be configured to determine one or more articulation parameters thresholds based on the speed, the position of the implement, and the payload of the machine; and modify the steering command when the one or more articulation parameters exceeds the one or more articulation parameters thresholds.

20 Claims, 3 Drawing Sheets

(56) References Cited

U.S. PATENT DOCUMENTS

| | | | |
|---|---|---|---|
| 2015/0259881 A1* | 9/2015 | Sharma | E02F 9/2033 701/50 |
| 2015/0259882 A1* | 9/2015 | Sharma | E02F 9/2087 701/41 |
| 2015/0259883 A1* | 9/2015 | Sharma | E02F 9/2087 701/41 |
| 2016/0236606 A1* | 8/2016 | Schwartz | B60P 1/045 |

* cited by examiner

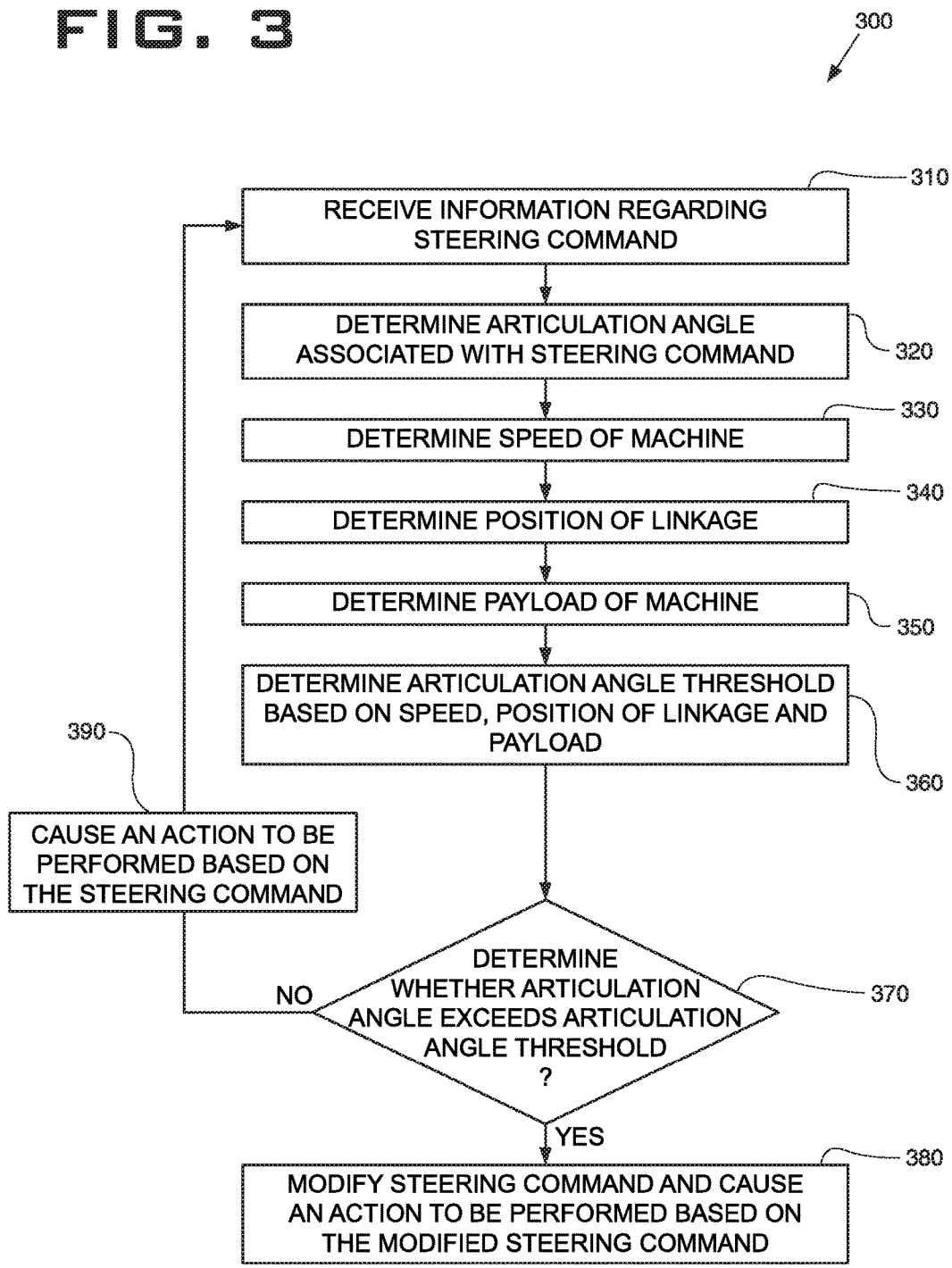

STABILITY CONTROL SYSTEM FOR MACHINE IN MOTION

TECHNICAL FIELD

The present disclosure generally relates to providing stability control for a machine in motion, and more particularly relates to providing stability control for a machine in motion based on a steering command of an operator of the machine.

BACKGROUND

A machine may be used to perform a variety of operations associated with one or more industries (such as mining, farming, construction, transportation, and/or the like). An operator of the machine may issue steering commands to cause the machine to navigate along different paths as part of performing the variety of operations. In some instances, a steering command may have an unintended effect on the machine. The unintended effect may be due to different factors relating to the various operations of the machine (e.g., a speed of the machine, a weight of the machine, etc.)

U.S. Pat. No. 7,721,842 (hereinafter the "'842 patent") is directed to a steering system for an articulated work vehicle that includes a first vehicle section and a second vehicle section. In this regard, the steering system comprises a controller that causes a reduction of a requested steering speed of the first vehicle section if the first vehicle section is positioned at an end region of a position range of the first vehicle section and if the requested steering speed meets or exceeds a threshold steering speed.

SUMMARY OF THE INVENTION

In some embodiments, a method may comprise receiving, by an electronic control module of a machine, steering command information regarding a steering command of the machine; determining, by the electronic control module and based on the steering command information, an articulation angle associated with the steering command or an articulation rate associated with the steering command; determining, by the electronic control module, a speed of the machine based on information from a first sensor; determining, by the electronic control module, a position of an implement of the machine based on information from a second sensor; determining, by the electronic control module, a payload of the machine based on information from a third sensor; determining by the electronic control module, a grade of a surface on which the machine is traveling; determining, by the electronic control module, an articulation angle threshold or an articulation rate threshold based on the speed of the machine, the position of the implement of the machine, the payload of the machine, and the grade; determining, by the electronic control module, whether the articulation angle exceeds the articulation angle threshold or whether the articulation rate exceeds the articulation rate threshold; and modify, by the electronic control module, the steering command when the articulation angle exceeds the articulation angle threshold or when the articulation rate exceeds the articulation rate threshold.

In some embodiments, a system may comprise a plurality of sensors configured to transmit sensor information regarding a speed of a machine, a position of an implement of the machine, a payload of the machine, and a grade of a surface on which the machine is traveling; and an electronic control module configured to: receive steering command information regarding a steering command of the machine; determine, based on the steering command information, one or more articulation parameters associated with the steering command; determine the speed of the machine, the position of the implement of the machine, the payload of the machine, and the grade based on the sensor information; determine one or more articulation parameters thresholds based on the speed of the machine, the position of the implement of the machine, the payload of the machine, and the grade; determine whether the one or more articulation parameters exceed the one or more articulation parameters thresholds; and modify the steering command when the one or more articulation parameters exceed the one or more articulation parameters thresholds.

In some embodiments, a machine may comprise a plurality of sensors configured to transmit information regarding a speed of the machine, a position of an implement of the machine, a payload placed on the implement, and a grade of a surface on which the machine is traveling; and an electronic control module configured to: receive steering command information regarding a steering command of the machine; determine, based on the steering command information, one or more articulation parameters associated with the steering command; determine the speed of the machine, the position of the implement of the machine, the payload of the machine, and the grade based on the information regarding the speed of the machine, the position of the implement of the machine, the payload, and the grade; determine one or more articulation parameters thresholds based on the speed of the machine, the position of the implement of the machine, and the payload; and modify the steering command when the one or more articulation parameters exceed the one or more articulation parameters thresholds.

BRIEF DESCRIPTION OF THE DRAWINGS

FIG. 3 is a flow chart of an example process for providing stability control to the machine of FIG. 1 based on a steering command.

DETAILED DESCRIPTION

The present disclosure relates to providing stability control to a machine as the machine is in motion. In this regard, the stability of the machine may be affected when a steering command is issued while the machine is traveling a particular speed, an implement of the machine is at a particular position, and/or a particular payload is placed on the implement. Accordingly, the present disclosure relates to providing stability control (maintaining or improving stability) by modifying a steering command based on a speed of the machine, a position of an implement of the machine, a payload placed on the implement, and/or a grade of a surface (or a slope of the surface) on which the machine is traveling. The following detailed description refers to the accompanying drawings. The same reference numbers in different drawings may identify the same or similar elements.

Figure 1:
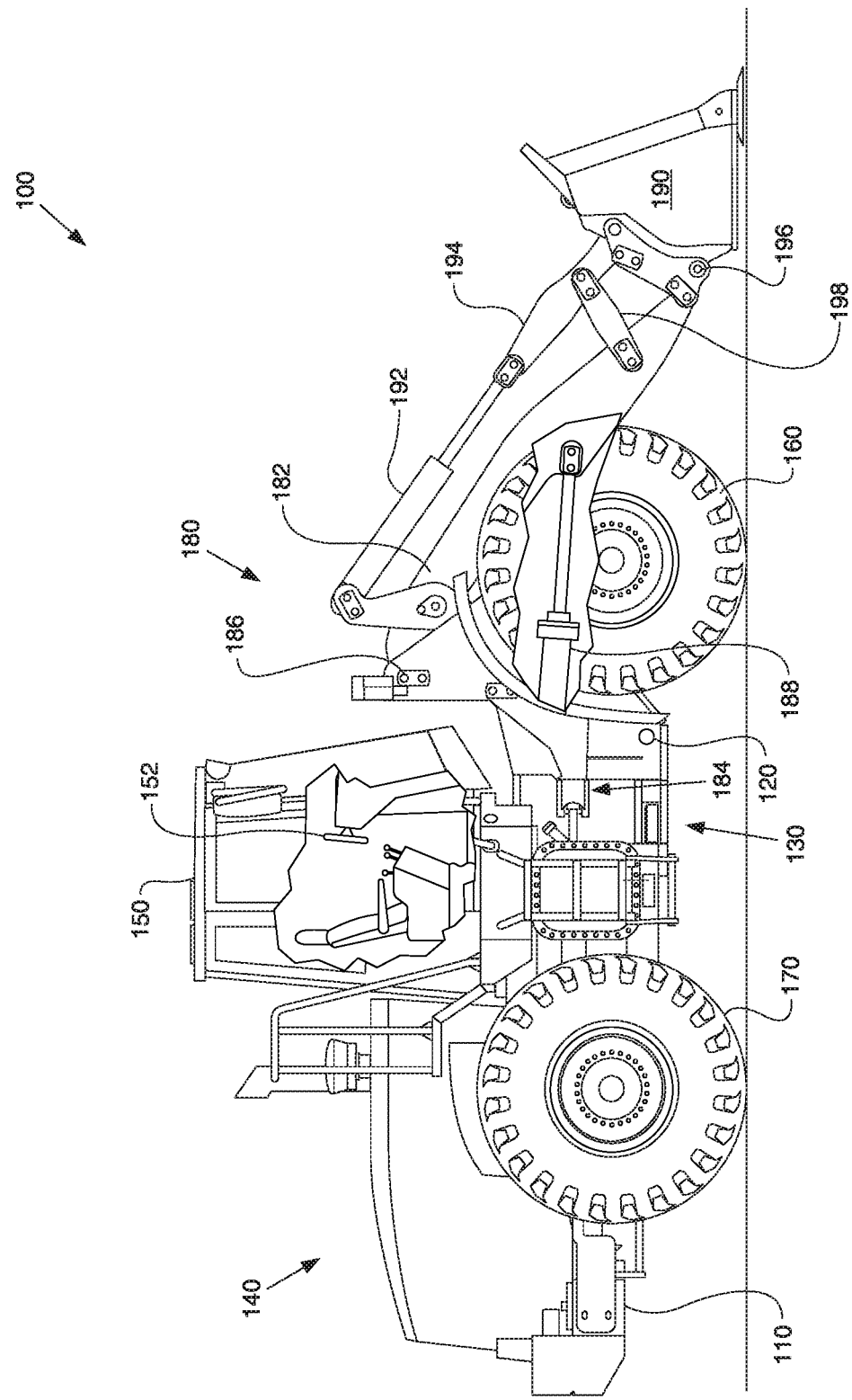
FIG. 1 is a side view of a machine according to one embodiment of the present disclosure.

FIG. 1 is a side view of a machine 100 (or a vehicle) according to an embodiment of the present disclosure. Machine 100 may be any machine associated with various industrial applications, including, but not limited to, mining, agriculture, forestry, construction, and/or other industrial applications. As illustrated in FIG. 1, machine 100 may be a wheel loader and, more specifically, an articulated wheel loader. In some implementations, machine 100 may include any other type of articulated machine, such as an articulated truck, and/or the like.

Machine 100 may include a body having a base portion 110 and an implement support portion 120 pivotally mounted on the base portion by an articulating joint 130. Base portion 110 may include an engine 140 and an operator station or cab 150 (in which an operator may be located). Cab 150 may include a steering wheel 152 which may be used by the operator to issue one or more steering commands to control steering of the machine 100. Additionally, or alternative, cab 150 may include one or more user interfaces that may be used by the operator to issue the one or more steering commands. For example, the one or more user interfaces may include one or more joysticks. In some implementations, steering wheel 152 may include (or may be associated with) one or more components that may transmit information regarding a steering command. For example, steering wheel 152 may include (or may be associated with) one or more sensors that may transmit information indicative of a steering command. In some implementations, steering wheel 152 may be an electrohydraulic (or electro-hydraulic) steering wheel.

Engine 140 may be operatively connected to and may drive a front set of ground engaging members (front ground engaging members) 160 and a rear set of ground engaging members (rear ground engaging members) 170, thereby causing movement of machine 100. In some embodiments, front ground engaging members 160 and/or rear ground engaging members 170 may include wheels and/or tires. Base portion 110 may include rear ground engaging members 170 while implement support portion 120 may include front ground engaging members 160. The articulating joint 130 may permit implement support portion 120 to pivot or move relative to base portion 110 for purposes of steering machine 100 (e.g., based on the steering commands).

The implement support portion 120 may include a linkage 200 including one or more lift arms 182 pivotally connected to the implement support portion 120 at first pivot joint 186. A work implement such as bucket 190 may be pivotally mounted at a distal end of lift arms 182 at a second pivot joint 196. A curl lever 194 may be pivotally mounted on curl lever support member of implement support portion 120 with a first end (not shown) connected to a curl link member 198 that is pivotally connected to bucket 190. With this configuration, rotation of the curl lever 194 may result in curling or tilting of the bucket 190 about the second pivot joint 196.

The machine 100 may include a system such as a hydraulic system for operating various systems and components of the machine. A pair of steering cylinders 184 (only one being visible in FIG. 1) may extend between the base portion 110 and the implement support portion 120 and operate to control the movement of implement support portion 120 relative to the base portion 110 about the articulating joint 130 to control the steering of machine 100. A pair of lift cylinders 188 (only one being visible in FIG. 1) may operatively extend between implement support portion 120 to lift arms 182 to facilitate raising and lowering of the lift arms 182 about first pivot joint 186. A curl cylinder 198 may operatively extend between the implement support portion 120 and the curl lever 194 to facilitate rotation or tilting of bucket 190 about second pivot joint 196. In some implementations, steering cylinders 184, lift cylinders 188, and/or curl cylinder 198 may be electrohydraulic cylinders or any other type of desired cylinders.

The number of components shown in FIG. 1 is provided for explanatory purposes. In practice, there may additional components, fewer components, different components, or differently arranged components than those shown in FIG. 1.

Figure 2:
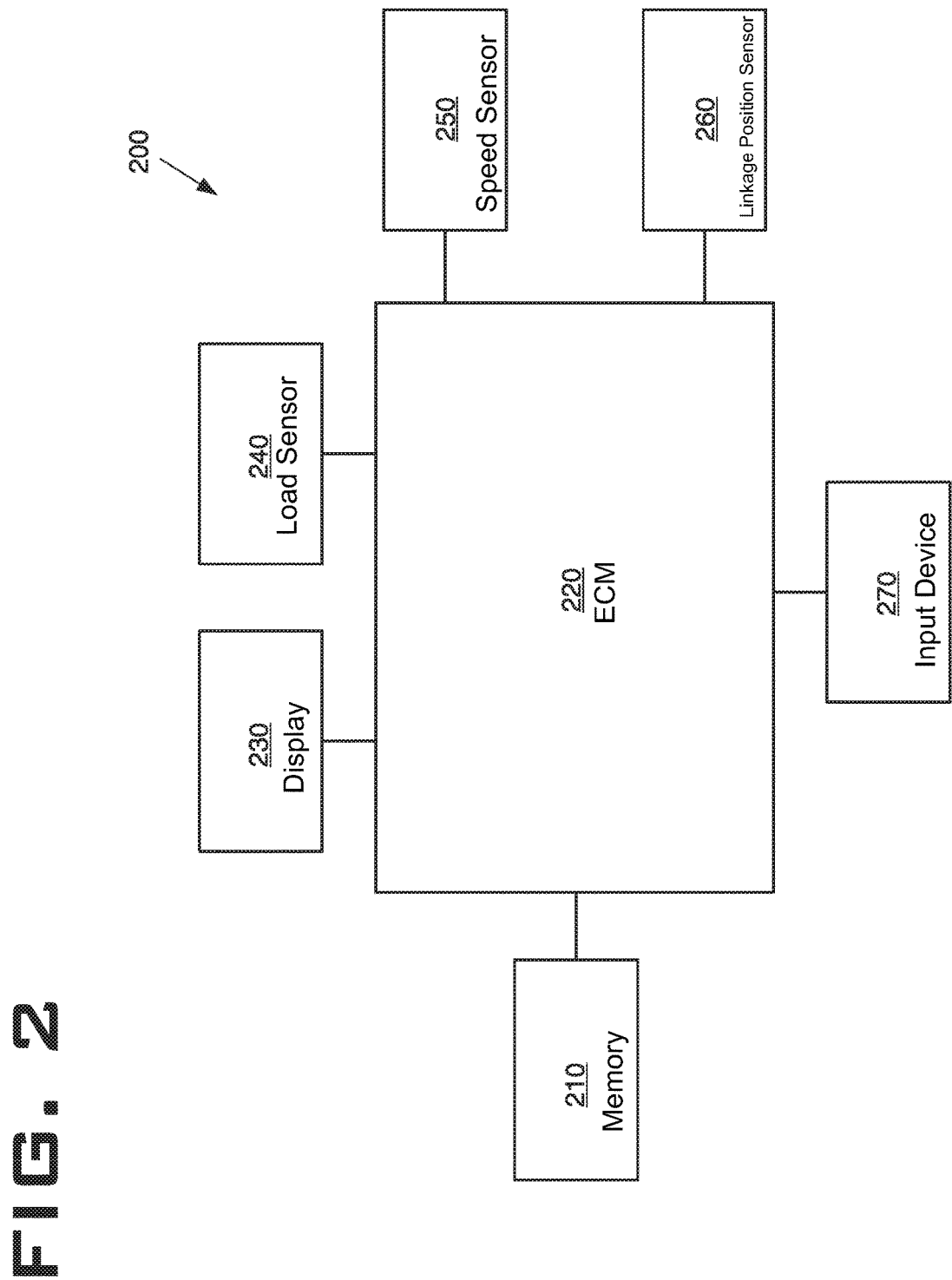
FIG. 2 is a diagram of example components of the machine of FIG. 1.

FIG. 2 is a diagram of example components 200 of machine 100 of FIG. 1. In some implementations, example components 200 may include electrical components of the machine 100. For example, example components 200 may include a memory 210, an electronic control module (ECM) 220, a display 230, a load sensor 240, a speed sensor 250, a linkage position sensor 260, and an input device 270. Example components 200 may be implemented using hardware, software, and/or a combination of hardware and software. In some implementations, memory 210, ECM 220, display 230, and/or input device 270 may be located inside or in an area proximate to operator cab 150. In some implementations, one or more of example components 200 may form a stability control system for machine 100.

Memory 210 may include a random access memory ("RAM"), a read only memory ("ROM"), and/or another type of dynamic or static storage device (e.g., a flash, magnetic, or optical memory) that stores information and/or instructions for use by other components 200 of machine 100, such as ECM 220. Additionally, or alternatively, memory 210 may include non-transitory computer-readable medium or memory, such as a disc drive, flash drive, optical memory, read-only memory (ROM), or the like. In some implementations, memory 210 may store the information and/or the instructions in one or more data structures, such as one or more databases, tables, lists, trees, etc. In some implementations, the information and/or the instructions may enable ECM 220 to perform one or more functions, as explained in more detail below. For example, the information and/or the instructions may include threshold information that may be used by ECM 220 to determine an articulation angle threshold.

ECM 220 may include any type of device or any type of component that may interpret and/or execute the instructions stored within memory 210 to perform one or more functions. For example, ECM 220 may execute the instructions to determine whether an articulation angle, associated with a steering command, exceed an articulation angle threshold and to cause an action to be performed accordingly. In some implementations, ECM 220 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.), and/or any other hardware and/or software.

In some embodiments, ECM 220 may obtain information from the electrical components of machine 100 and use the information to perform the one or more functions. For example, ECM 220 may obtain sensor information from a plurality of sensors (e.g., load sensor 240, speed sensor 250, linkage position sensor 260, and/or a grade sensor) and use the sensor information to determine an articulation angle threshold and/or an articulation rate threshold. ECM 220 may receive steering information indicative of a steering command and determine an articulation angle and/or an articulation rate associated with the steering command.

In some implementations, ECM 220 may transmit, via a network (not shown) information regarding machine 100 to a back office system (not shown). For example, ECM 220 may transmit the sensor information to the back office system to cause the back office system to determine the articulation angle threshold and/or the articulation rate threshold. Additionally, or alternatively, ECM 220 may receive, via the network, information identifying the articulation angle threshold and/or the articulation rate threshold. In some implementations, the back office system may include one or more devices and the network may include one or more wired and/or wireless networks.

Display 230 may include any type of device or any type of component that may display information. For example, display 230 may display information relating to machine 100 and/or relating to a steering command from an operator of machine 100. For instance, display 230 may display information indicating whether the steering command has modified, information indicating a reason for modifying the steering command (e.g., information identifying a speed of machine 100, a load on machine 100, a position of linkage 180 (e.g., a position of lift arms 182)), and/or other information based on which the steering command may modified.

Load sensor 240 may include any type of device or any type of component that may sense (or detect) that a load (or payload) has been placed on machine 100 (e.g., placed on bucket 190), may determine a weight of (or an amount of) the load, and may transmit, to ECM 220, information indicating that a load has been placed on bucket 190 along with information identifying the weight of the load. For example, load sensor 240 may include a pressure sensor, a force gauge, a load cell, and/or any other components capable of sensing (or sensing) that a load has been placed bucket 190 and capable of determining the weight of the load or obtaining information that may be used to determine the weight of the load. In some embodiments, load sensor 240 may be located near or in curl cylinder 192.

Speed sensor 250 may include any component or any type of device that may sense (or detect) a movement of machine 100 and may transmit, to ECM 220, information regarding a movement of machine 100. For example, speed sensor 250 may detect the speed of machine 100 and may transmit, to ECM 220, speed information regarding the speed of machine 100. In some embodiments, speed sensor 250 may include an accelerometer. For example, the accelerometer may include a laser accelerometer, a low frequency accelerometer, a bulk micromachined capacitive accelerometer, a strain gauge accelerometer, and a bulk micromachined piezoelectric accelerometer, and/or the like. In some embodiments, speed sensor 250 may include an inertial measurement unit. For example, the inertial measurement unit may measure any linear and/or angular motion of machine 100. In some embodiments, speed sensor 250 may be located on a portion of base portion 110 and/or implement support portion 120. For example, speed sensor 250 may be located near rear ground engaging members 160 and/or front ground engaging members 170. Additionally, or alternatively, speed sensor 250 may be pointing toward a ground surface on which machine 100 is traveling.

Linkage position sensor 260 may include any component or any type of device that may sense (or detect) a position of linkage 180 and may transmit, to ECM 220, information regarding the position of linkage 180. For example, linkage position sensor 260 may detect a position of lift arms 182 and may transmit, to ECM 220, information regarding the position of lift arms 182. For example, linkage position sensor 260 may determine whether lift arms 182 are raised or lowered and may transmit, to ECM 220, information regarding whether lift arms 182 are raised or lowered. In other words, linkage position sensor 260 may determine a distance of a position between a ground surface on machine 100 is traveling and a portion lift arms 182 (e.g., a distal portion of lift arms 182 connecting to bucket 190) and may transmit information regarding the distance. For instance, linkage position sensor 260 may determine a height of lift arms 182 or a height of bucket 190. In some embodiments, linkage position sensor 260 may be located near or on a portion of lift arms 182. Additionally, or alternatively, linkage position sensor 260 may be located near or on a portion of curl cylinder 192. Additionally, or alternatively, linkage position sensor 260 may be an angle sensor which may be near or on a portion of first pivot joint 186 and/or second pivot joint 196.

Input device 270 may include a component that permits a user (e.g., an operator of machine 100) to input information to one or more of example components 200. For example, the information, input by the user, may include information regarding a manner in which an articulation angle is to be calculated, a manner in which an articulation angle threshold is to be calculated, information regarding an action to be performed based on the articulation angle in light of the articulation angle threshold, and/or the like. In some embodiments, input device 260 may include a keyboard, a keypad, a mouse, a button, a camera, a microphone, a switch, a joystick, a touch screen display, and/or the like.

The number of components shown in FIG. 2 is provided for explanatory purposes. In practice, there may additional components, fewer components, different components, or differently arranged components than those shown in FIG. 2. For example, example components 200 may include global positioning system (GPS) to track and locate a position of machine 100. Additionally, or alternative, example components 200 may include a grade sensor to determine a grade of a surface (or a path) on which machine 100 is traveling. The grade sensor may be connected to ECM 220 in a manner similar to the connection between ECM 220 and memory 210, display 230, load sensor 240, speed sensor 250, linkage position sensor 260, and input device 270 (as illustrated in FIG. 2). In some implementations, the grade sensor may include an Inertial Measurement Unit (IMU). For example, the IMU may include one or more accelerometers and/or gyroscopes that generate information regarding the grade.

FIG. 3 is a flow chart of an example process 300 for providing stability control to the machine of FIG. 1 based on a steering command. In some implementations, one or more process blocks of process 300 may be performed by ECM 220. For example, ECM 220 may perform one or more process blocks of process 300 automatically (e.g., without intervention/input from an operator of machine 100). In some implementations, one or more process blocks of FIG. 3 may be performed by another device or a group of devices separate from or including ECM 220, such as the back office system.

As shown in FIG. 3, process 300 may include receiving information regarding a steering command (block 310). For example, ECM 220 may receive steering command information regarding a steering command issued by an operator of machine 100 using steering wheel 152 (or using one or more other user interfaces such as one or more joysticks). For instance, ECM 220 may receive the steering command information regarding the steering command from one or more components included in and/or associated with steering wheel 152. In some implementations, the steering command information may include information identifying a direction of rotation of steering wheel 152 (e.g., left or right), information identifying a degree of the rotation, information identifying a speed or a velocity of the rotation, information identifying a force of the rotation, and/or the like.

As shown in FIG. 3, process 300 may further include determining an articulation angle associated with the steering command (block 320). For example, ECM 220 may determine (or predict) an articulation angle of machine 100 that may occur as a result of the steering command, based on the steering command information. In some implementations, the articulation angle may correspond to an articulation angle between base portion 110 and implement support portion 120 (e.g., at articulation joint 130).

In some implementations, ECM 220 may determine the articulation angle based on the direction of rotation of steering wheel 152, the degree of the rotation, the speed of the rotation, and/or the force of the rotation. For example, ECM 220 may determine the articulation angle based on correlation information that correlate different articulation angles with different directions of rotations, degrees of rotations, speeds of rotations, and/or forces of rotations. Additionally, or alternatively, ECM 220 may calculate the articulation angle using the direction of rotation of steering wheel 152, the degree of the rotation, the speed of the rotation, and/or the force of the rotation. For instance, ECM 220 may calculate the articulation angle using a mathematical combination (e.g., based on one or more equations) of the direction of rotation of steering wheel 152, the degree of the rotation, the speed of the rotation, and/or the force of the rotation. In some implementations, the correlation information and information identifying the one or more equations may be stored in memory 210. In some implementations, ECM 220 may calculate the articulation angle using a position of steering cylinders and/or actuators. For example, ECM 220 may calculate the articulation angle using information regarding a position of steering cylinders 184. For instance, the information regarding the position of steering cylinders 184 may be obtained from a sensor associated with steering cylinders 184. In some implementations, ECM 220 may determine the articulation angle based on information received from a rotational sensor directly located on articulation joint 130. Additionally, or alternatively, ECM 220 may determine (or predict) an articulation rate of machine 100 based on the steering command information (e.g., in a manner similar to determining the articulation angle). For example, ECM 220 may calculate an articulation rate between base portion 110 and implement support portion 120 (e.g., at articulation joint 130) based on the direction of rotation of steering wheel 152, the degree of the rotation, the speed of the rotation, and/or the force of the rotation. In some implementations, the articulation rate may be expressed in units of angle measurement and units of time measurement. For example, the articulation rate may be expressed in degree(s) per second(s). In some implementations, the articulation rate and/or the articulation angle may be referred to as one or more articulation parameters associated with the steering command.

As shown in FIG. 3, process 300 may further include determining a speed of machine 100 (block 330). For example, ECM 220 may determine a speed of machine 100 based on receiving the steering command information. For instance, receiving the steering command information may serve a trigger for determining the speed of machine 100. In some implementations, ECM 220 may determine the speed of machine 100 using speed information from speed sensor 250. The speed information may include information identifying the speed of machine 100. In some implementations, ECM 220 may cause speed sensor 250 to detect (or sense) the speed of machine 100 and/or transmit the speed information based on receiving the steering command information. Alternatively, speed sensor 250 may detect (or sense) the speed of machine 100 periodically (i.e., independent of ECM 220 receiving the steering command information). In some implementations, ECM 220 may derive (or determine) the speed of machine 100 based on information (e.g., from a sensor) regarding a rate of rotation of any of powertrain's axles or wheels of machine 100. For example, ECM 220 may derive (or determine) the speed of machine 100 based on a rate of rotation of front ground engaging members 160 and/or rear ground engaging members 170.

As shown in FIG. 3, process 300 may further include determining a position of a linkage of machine 100 (block 340). For example, ECM 220 may determine a position of linkage 180 of machine 100 (or determine a geometry of linkage 180) based on receiving the steering command information. For instance, receiving the steering command information may serve a trigger for determining the position of linkage 180. In some implementations, ECM 220 may determine the position of linkage 180 using linkage position information regarding the position of linkage 180 from linkage position sensor 260. The linkage position information may include information identifying a position of lift arms 182. For instance, the information identifying the position of lift arms 182 may include information regarding whether lift arms 182 are raised or lowered. In some implementations, information regarding whether lift arms 182 are raised or lowered may include information identifying a distance between a ground surface and a portion of lift arms 182 (e.g., a distal portion of lift arms 182 connecting to bucket 190). In some implementations, ECM 220 may cause linkage position sensor 260 to detect (or sense) the position of linkage 180 and/or transmit the linkage position information based on receiving the steering command information. Alternatively, linkage position sensor 260 may periodically detect (or sense) the position of linkage 180 (i.e., independent of ECM 220 receiving the steering command information).

As shown in FIG. 3, process 300 may further include determining a payload of machine 100 (block 350). For example, ECM 220 may determine a weight (or a mass) of a payload of bucket 190 based on receiving the steering command information. For instance, receiving the steering command information may serve as a trigger for determining the weight of the payload of bucket 190. In some implementations, ECM 220 may determine the weight of the payload of bucket 190 using payload information (regarding the payload placed on bucket 190) received from load sensor 240. The payload information may include information identifying a weight of the payload placed on bucket 190 and/or information regarding the payload that may be used, by ECM 220, to determine the weight of the payload. In some implementations, ECM 220 may cause payload sensor 240 to detect (or sense) the payload on bucket 190 and/or transmit the payload information based on receiving the steering command information. Additionally, or alternatively, load sensor 240 may periodically detect (or sense) the payload (i.e., independent of ECM 220 receiving the steering command information). In some implementations, ECM 220 may determine the weight of the payload in manner similar to that described in U.S. Pat. No. 6,518,519.

In some implementations, ECM 220 may determine a grade of a ground surface (or path) on which machine 100 is traveling based on receiving the steering command information. For example, receiving the steering command information may serve a trigger for determining the grade (or the slope of the ground surface). In some implementations, ECM 220 may determine the grade using grade information from the grade sensor (described above). The grade information may include information identifying the grade. In some implementations, ECM 220 may cause the grade sensor to detect (or sense) the grade of the ground surface on which machine 100 is traveling and/or transmit the grade information based on receiving the steering command information. Alternatively, the grade sensor may detect (or sense) the grade periodically (i.e., independent of ECM 220 receiving the steering command information).

As shown in FIG. 3, process 300 may further include determining an articulation angle threshold based on the speed of machine 100, the position of linkage 180, and the payload (block 360). For example, ECM 220 may determine an articulation angle threshold based on the speed of machine 100, the position of linkage 180, the weight of the payload, and/or the grade of the ground surface. In some implementations, ECM 220 may determine the articulation angle threshold based on angle threshold correlation information that correlates different angle thresholds with different speeds, linkage positions, weights of payload, and/or different grades. Additionally, or alternatively, ECM 220 may calculate the articulation angle threshold using a mathematical combination of the speed of machine 100, the position of linkage 180, the weight of the payload, and/or the grade. For example, ECM 220 may calculate the articulation angle threshold using one or more equations that include the speed of machine 100, the position of linkage 180, the weight of the payload, and/or the grade. In some implementations, the angle threshold correlation information and the information identifying the one or more equations may be stored in memory 210. In some implementations, with respect to the one or more equations, the weight of the payload, the speed of machine 100, the position of linkage 180, and/or the grade may be weighted. In other words, the weight of the payload, the speed of machine 100, the position of linkage 180, and/or the grade may be assigned different weights that may increase or decrease the values for the weight of the payload, the speed of machine 100, the position of linkage 180, and/or the grade in the one or more equations. In some implementations, the different weights may be based on a respective threshold for the weight of the payload, the speed of machine 100, the position of linkage 180, and/or the grade.

In some implementations, ECM 220 may determine the articulation angle threshold based on one or more additional or alternative parameters relating to machine 100, in a manner similar to that described above. Additionally, or alternatively, ECM 220 may determine the articulation angle threshold based on a level of sharpness and/or a level of aggressiveness of the steering command. In this regard, ECM 220 may determine the level of sharpness and/or the level of aggressiveness of the steering command based on the direction of rotation of steering wheel 152, the degree of the rotation, the speed of the rotation, and/or the force of the rotation (e.g., included in the steering command information). Additionally, or alternatively, ECM 220 may determine (or predict) an articulation rate threshold of machine 100 based on the speed of machine 100, the position of linkage 180, the weight of the payload, and/or the grade (e.g., in a manner similar to determining the articulation angle threshold). For example, ECM 220 may determine the articulation rate threshold based on rate threshold correlation information that correlates different articulation rate thresholds with different speeds, linkage positions, weights of payload, and/or different grades. Additionally, or alternatively, ECM 220 may calculate the articulation rate threshold using a mathematical combination of the speed of machine 100, the position of linkage 180, the weight of the payload, and/or the grade. In some implementations, the articulation rate threshold and/or the articulation angle threshold may be referred to as one or more articulation parameters thresholds.

In some implementations, the articulation parameters thresholds (e.g., the articulation angle threshold and/or the articulation rate threshold) may be dynamic threshold(s). In other words, the articulation angle threshold and/or the articulation rate threshold may be different based on different values for the speed, the position of linkage 180, the weight of the payload, and/or the grade. In some implementations, the articulation angle threshold and/or the articulation rate threshold may be determined based on a trigger event (e.g., each time a steering command is issued and/or periodically).

As shown in FIG. 3, process 300 may further include determining whether the articulation angle exceeds the articulation angle threshold (block 370). For example, ECM 220 may determine whether the articulation angle (associated with the steering command) exceeds the articulation angle threshold (determined based on the speed, the position of linkage 180, the weight of the payload, and/or the grade). For instance, ECM 220 may compare the articulation angle to the articulation angle threshold to determine whether the articulation angle exceeds the articulation angle threshold. Additionally, or alternatively, ECM 220 may determine whether the articulation rate (associated with the steering command) exceeds the articulation rate threshold. Accordingly, ECM 220 may determine whether the one or more articulation parameters exceed the one or more articulation parameters thresholds.

As further shown in FIG. 3, if the articulation angle exceeds the articulation angle threshold or if the articulation rate exceeds the articulation rate threshold, (block 370—YES), then process 300 may include modifying the steering command and causing an action to be performed based on the modified steering command, thereby providing stability control to machine 100 while machine 100 is in motion. For example, ECM 220 may modify (or override) the steering command and cause an action to be performed based on the modified steering command. In some implementations, ECM 220 may modify the steering command by causing the articulation angle associated with the steering command to be decreased. For example, the articulation angle may be decrease to an angle that is less than or equal to the articulation angle threshold. ECM 220 may then cause the decreased articulation angle to be implemented between base portion 110 and implement support portion 120. Additionally, or alternatively, ECM 220 may modify the steering command by decreasing the articulation rate. For example, ECM 220 may decrease a speed rotation of machine 100 (e.g., a speed of rotation of base portion 110 with respect to implement support portion 120) to achieve the articulation angle associated with the steering command. In this regard, the speed of rotation of machine 100 may be less than the speed of the rotation of the steering command. ECM 220 may then cause the decreased articulation rate to be implemented (e.g., the speed of rotation of implement support portion 120 with respect to base portion 110 to be implemented). Accordingly, ECM 220 may provide stability control to machine 100 as machine 100 is in motion.

In some implementations, ECM 220 may cause display 230 to display information indicating that the steering command has been modified, information indicating a manner in which the steering command has been modified (e.g., decreased articulation angle, decreased articulation rate, etc.), information indicating a reason for modifying the steering command (e.g., the articulation angle exceeding the articulation angle threshold), and/or the like.

As further shown in FIG. 3, if the articulation angle does not exceed the articulation angle threshold, (block 370—NO), then process 300 may include causing an action to be performed based on the steering command. For example, ECM 220 may cause an action to be performed based on the steering command without modifying the steering command. For instance, ECM 220 may cause a rotation of implement support portion 120 with respect to base portion 110 to be implemented based on the steering command.

In some implementations, one or more process blocks of process 300 may be performed in an order different than the order illustrated in FIG. 3. For example, block 330, block 340, and block 350 may be performed in an order different than the order illustrated in FIG. 3. Alternatively, block 330, block 340, and block 350 may be performed simultaneously or substantially simultaneously.

INDUSTRIAL APPLICABILITY

The present disclosure finds utility in various industrial applications, such as in transportation, mining, construction, industrial, earthmoving, agricultural, and forestry machines and equipment. For example, the present disclosure and the provided assistance may be applied to hauling machines, dump trucks, mining vehicles, on-highway vehicles, off-highway vehicles, trains earth-moving vehicles, agricultural equipment, material handling equipment, and/or the like.

More particularly, the present disclosure relates to providing stability control to a machine as the machine is in motion. In this regard, the stability of the machine may be affected when a steering command is issued while the machine is traveling a particular speed, a particular position of an implement of the machine, and/or a payload is placed on the implement. Accordingly, the present disclosure relates to providing stability control (maintaining or improving stability) by taking in consideration a steering command with respect to a speed of the machine, a position of an implement of the machine, and/or a payload placed on the implement. More particularly, the present disclosure relates to providing stability control by adjusting a steering command based on the speed of the machine, the position of the implement of the machine, and/or the payload placed on the implement.

No element, act, or instruction used herein should be construed as critical or essential unless explicitly described as such. While the present disclosure has been referring to articulated wheel loaders, one skilled in the art would appreciate that the present disclosure may similarly apply to any articulated machine (including articulated machines with or without implements). Additionally, while the present disclosure has been referring to a bucket, one skilled in the art would appreciate that the present disclosure may similarly apply to any other work tools (or work implements). As used herein, "height" or "distance" may be in a measurement unit to known to one skilled in the art. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   receiving, by an electronic control module of a machine, steering command information regarding a steering command of the machine;
   determining, by the electronic control module and based on the steering command information, an articulation angle of the machine or an articulation rate of the machine,
      the articulation angle and the articulation rate being associated with the steering command,
   determining, by the electronic control module, a speed of the machine based on information from a first sensor;
   determining, by the electronic control module, a position of an implement of the machine based on information from a second sensor;
   determining, by the electronic control module, a payload of the machine based on information from a third sensor;
   determining by the electronic control module, a grade of a surface on which the machine is traveling;
   determining, by the electronic control module, an articulation angle threshold or an articulation rate threshold based on the speed of the machine, the position of the implement of the machine, the payload of the machine, and the grade;
   determining, by the electronic control module, whether the articulation angle exceeds the articulation angle threshold or whether the articulation rate exceeds the articulation rate threshold; and
   modify, by the electronic control module, the steering command to modify the articulation angle of the machine when the articulation angle exceeds the articulation angle threshold or to modify the articulation rate of the machine when the articulation rate exceeds the articulation rate threshold.

2. The method of claim 1, wherein modifying the steering command includes decreasing the articulation angle.

3. The method of claim 1, wherein modifying the steering command includes decreasing the articulation rate.

4. The method of claim 1, wherein determining the payload of the machine includes determining a weight of the payload of the machine, and
   wherein determining the articulation angle threshold or the articulation rate threshold includes determining the articulation angle threshold or the articulation rate threshold based on the speed of the machine, the position of the linkage of the machine, and the weight of the payload of the machine.

5. The method of claim 1, wherein determining the position of the implement of the machine includes determining a height of the implement of the machine, and
   wherein determining the articulation angle threshold or the articulation rate threshold includes determining the articulation angle threshold or the articulation rate threshold based on the speed of the machine, the height of the implement of the machine, and the payload of the machine.

6. The method of claim 1, wherein receiving the steering command information includes receiving the steering command from one or more components associated with an electrohydraulic steering wheel of the machine.

7. The method of claim 1, further comprising providing for display:
   information indicating that the steering command has been modified.

8. The method of claim 1, further comprising providing for display at least one of:

information indicating a manner in which the steering command has been modified, or information indicating a reason for modifying the steering command.

9. A system comprising:

a plurality of sensors configured to transmit sensor information regarding a speed of a machine, a position of an implement of the machine, a payload of the machine, and a grade of a surface on which the machine is traveling; and an electronic control module configured to:

receive steering command information regarding a steering command of the machine;

determine, based on the steering command information, one or more articulation parameters of the machine, the one or more articulation parameters being associated with the steering command, determine the speed of the machine, the position of the implement of the machine, the payload of the machine, and the grade based on the sensor information;

determine one or more articulation parameters thresholds based on the speed of the machine, the position of the implement of the machine, and the payload of the machine;

determine whether the one or more articulation parameters exceed the one or more articulation parameters thresholds; and modify the steering command to modify the one or more articulation parameters of the machine when the one or more articulation parameters exceed the one or more articulation parameters thresholds.

10. The system of claim 9, wherein, when modifying the steering command, the electronic control module is to decrease an articulation angle of the machine.

11. The system of claim 9, wherein, when modifying the steering command, the electronic control module is to decrease a speed of rotation of the machine to achieve an articulation angle of the machine, and wherein the decreased speed of rotation of the machine is less than a speed of rotation of the steering command.

12. The system of claim 9, wherein the payload of the machine includes a payload placed on the implement of the machine, wherein, determining the payload of the machine, includes determining a weight of the payload placed on the implement of the machine, and wherein, when determining the one or more articulation parameters thresholds, the electronic control module is to determine the one or more articulation parameters thresholds based on the speed of the machine, the position of the implement of the machine, and the weight of the payload placed on the implement of the machine.

13. The system of claim 9, wherein, when determining the position of the implement of the machine, the electronic control module is to determine a height of the implement of the machine, and wherein, when determining the one or more articulation parameters thresholds, the electronic control module is to determine the one or more articulation parameters thresholds based on the speed of the machine, the height of the implement of the machine, and the payload of the machine.

14. The system of claim 9, wherein, when receiving the steering command information, the electronic control module is to receive the steering command from one or more components associated with an electrohydraulic steering wheel of the machine.

15. The system of claim 9, wherein the electronic control module is further configured to provide for display information indicating that the steering command has been modified.

16. The system of claim 15, wherein the electronic control module is further configured to provide for display at least one of:

information indicating a manner in which the steering command has been modified, or information indicating a reason for modifying the steering command.

17. A machine comprising:

a plurality of sensors configured to transmit information regarding a speed of the machine, a position of an implement of the machine, a payload placed on the implement, and a grade of a surface on which the machine is traveling; and an electronic control module configured to:

receive steering command information regarding a steering command of the machine;

determine, based on the steering command information, one or more articulation parameters of the machine, the one or more articulation parameters being associated with the steering command, determine the speed of the machine, the position of the implement of the machine, the payload of the machine, and the grade based on the information regarding the speed of the machine, the position of the implement of the machine, the payload, and the grade;

determine one or more articulation parameters thresholds based on the speed of the machine, the position of the implement of the machine, the payload, and the grade; and modify the steering command to modify the one or more articulation parameters of the machine when the one or more articulation parameters exceeds the one or more articulation parameters thresholds.

18. The machine of claim 17, wherein, when modifying the steering command, the electronic control module is to:

decrease an articulation angle of the machine; or decrease an articulation rate of the machine.

19. The machine of claim 17, wherein, when receiving the steering command information, the electronic control module is to receive the steering command from one or more components associated with an electrohydraulic steering wheel of the machine.

20. The machine of claim 19, wherein, when determining the position of the implement of the machine, the electronic control module is to determine a height of the implement of the machine, and wherein, when determining the one or more articulation parameters thresholds, the electronic control module is to determine the one or more articulation parameters thresholds based on the speed of the machine, the height of the implement of the machine, and the payload of the machine.

\* \* \* \* \*